(12) United States Patent
Okamoto et al.

(10) Patent No.: US 10,913,327 B2
(45) Date of Patent: Feb. 9, 2021

(54) AIR CONDITIONER FOR VEHICLE

(71) Applicant: DENSO CORPORATION, Kariya (JP)

(72) Inventors: Tsuyoshi Okamoto, Kariya (JP); Takayuki Watanabe, Kariya (JP)

(73) Assignee: DENSO CORPORATION, Kariya (JP)

( * ) Notice: Subject to any disclaimer, the term of this patent is extended or adjusted under 35 U.S.C. 154(b) by 144 days.

(21) Appl. No.: 15/771,558

(22) PCT Filed: Oct. 11, 2016

(86) PCT No.: PCT/JP2016/080057
§ 371 (c)(1),
(2) Date: Apr. 27, 2018

(87) PCT Pub. No.: WO2017/110214
PCT Pub. Date: Jun. 29, 2017

(65) Prior Publication Data
US 2018/0312038 A1 Nov. 1, 2018

(30) Foreign Application Priority Data

Dec. 21, 2015 (JP) ................................. 2015-249041

(51) Int. Cl.
*B60H 1/02* (2006.01)
*B60H 1/03* (2006.01)
*B60H 1/22* (2006.01)

(52) U.S. Cl.
CPC .............. *B60H 1/025* (2013.01); *B60H 1/03* (2013.01); *B60H 1/032* (2013.01); *B60H 1/034* (2013.01); *B60H 1/22* (2013.01); *B60H 2001/2228* (2013.01); *B60H 2001/2253* (2013.01); *F01P 2060/16* (2013.01)

(58) Field of Classification Search
USPC .............................................................. 237/5
See application file for complete search history.

(56) References Cited

U.S. PATENT DOCUMENTS 5,588,498 A * 12/1996 Kitada ..................... B60K 6/46
180/65.245
2001/0013409 A1* 8/2001 Burk ....................... B60H 1/025
165/240

(Continued)

FOREIGN PATENT DOCUMENTS

JP   S59-069673 A   4/1984
JP   2007-137184 A   6/2007

(Continued)

OTHER PUBLICATIONS

Dec. 16, 2016 International Search Report issued in Patent Application No. PCT/JP2016/080057.

*Primary Examiner* — Steven B McCallister
*Assistant Examiner* — John E Bargero
(74) *Attorney, Agent, or Firm* — Oliff PLC

(57) ABSTRACT

An air conditioner for a vehicle includes a cooling water circuit and a heater. The cooling water circuit allows a cooling water to circulate between an engine and a heater core in a heating operation. The engine is a power source of the vehicle. The heater core is configured to heat air using a heat of the cooling water. The heater is located downstream of the engine and upstream of the heater core in the cooling water circuit and is configured to heat the cooling water.

12 Claims, 9 Drawing Sheets

(56) References Cited

U.S. PATENT DOCUMENTS

| | | | |
|---|---|---|---|
| 2009/0183697 A1* | 7/2009 | Inui | B60H 1/00921 |
| | | | 123/41.02 |
| 2009/0205353 A1* | 8/2009 | Takahashi | B60H 1/00899 |
| | | | 62/324.1 |
| 2011/0120394 A1 | 5/2011 | Onozawa et al. | |
| 2012/0017637 A1 | 1/2012 | Nakajo et al. | |
| 2014/0097261 A1* | 4/2014 | Blumenstock | B60H 1/00492 |
| | | | 237/5 |
| 2014/0103128 A1* | 4/2014 | Patel | B60H 1/00885 |
| | | | 237/5 |
| 2015/0089943 A1* | 4/2015 | Hussain | F01N 5/02 |
| | | | 60/615 |
| 2015/0275741 A1* | 10/2015 | Amano | B60W 20/00 |
| | | | 60/320 |
| 2016/0347150 A1* | 12/2016 | Kakade | B60H 1/00885 |
| 2016/0362110 A1* | 12/2016 | Martini | B60W 10/30 |

FOREIGN PATENT DOCUMENTS

| | | |
|---|---|---|
| JP | 2007-283830 A | 11/2007 |
| JP | 2008-038916 A | 2/2008 |
| JP | 2008-111365 A | 5/2008 |
| JP | 2008-202485 A | 9/2008 |
| JP | 2008-223488 A | 9/2008 |
| JP | 2014-131914 A | 7/2014 |

* cited by examiner

AIR CONDITIONER FOR VEHICLE

CROSS REFERENCE TO RELATED APPLICATION

This application is based on and claims the benefit of priority from Japanese Patent Application No. 2015-249041 filed on Dec. 21, 2015. The entire disclosure of the application is incorporated herein by reference.

TECHNICAL FIELD

The present disclosure relates to air conditioners for a vehicle. Such air conditioners may include a heater core that is configured to heat air using the heat of cooling water for an engine that is a power source for the vehicle.

BACKGROUND ART

Hybrid vehicles are widely used in recent years due to societal demand requesting to improve fuel consumption and to reduce the exhaust gas. Such hybrid vehicles may include the engine and a motor as power sources. For example, the hybrid vehicles may improve the fuel consumption by operating EV mode that moves the vehicle by the motor while stopping the engine. However, the fuel consumption tends to deteriorate in winter since a time period in which the engine is operated becomes longer to generate a required amount of heat required for a heating operation of the air conditioners. The amount of heat may be an amount of heat from the cooling water for the engine.

Patent Literature 1 discloses a heater, which is a heat source other than the engine, configured to heat the cooling water. The heater includes a heat pump and an exhaust-heat recovery device. A rotational speed of a compressor for the heat pump based on a temperature of the cooling water, a temperature of the exhaust gas, and a load applied to the engine. As a result, power consumption of the heat pump is reduced.

PRIOR ART LITERATURES

Patent Literature

Patent Literature 1: JP 2007-283830 A

SUMMARY OF INVENTION

Patent Literature 1 does not explicitly disclose an arrangement of the engine, the heater core, and the heater in the cooling water circuit through which the cooling water circulates. However, for example, it may be considered to arrange the heater downstream of the engine and to arrange the heater downstream of the heater core. According to this arrangement, the cooling water flows into the engine after being heated in the heater. On the other hand, since the heated cooling water flows into the engine, a temperature of the cooling water in an inlet of the engine tends to be high. Therefore, the engine can be warmed, however the amount of heat transmitting from the engine to the cooling water reduces, and thus the amount of heat dissipated from the heated engine to the atmosphere may increase. That is, exhaust heat increases, and whereby the fuel consumption may deteriorate. In addition, a temperature of the cooling water in an outlet of the engine is required to be heated such that the temperature of the cooling water in the inlet of the engine becomes a specified temperature. Therefore, a temperature at which the warm-up operation for warming the engine is completed and the engine can be stopped is required to be set relatively high. Thus, in vehicles being operable in the EV-traveling mode, starting the EV-traveling mode delays, and therefore the fuel consumption effect in the EV-traveling mode may deteriorate.

It is an objective of the present disclosure to provide an air conditioner for a vehicle that includes a system including a heater core, which is configured to heat the air using the heat of the cooling water for an engine, and that can improve the fuel consumption of the vehicle.

An air conditioner for a vehicle in the present disclosure includes a cooling water circuit and a heater. The cooling water circuit allows a cooling water to circulate between an engine and a heater core in a heating operation. The engine is a power source of the vehicle. The heater core is configured to heat air using a heat of the cooling water. The heater is located downstream of the engine and upstream of the heater core in the cooling water circuit and is configured to heat the cooling water.

According to the above-specified configuration, the cooling water flowing out of the engine can be heated by the heater, and thus the heated cooling water can flow into the heater core. Accordingly, the temperature of the cooling water in the outlet of the engine is not necessarily increased such that the temperature of the cooling water in the inlet of the heater core becomes the specified temperature. As a result, the temperature of the cooling water, at which the warm-up operation is completed and the engine can be stopped, can be relatively low. Therefore, in the vehicle operable in the EV-traveling mode, the EV-traveling mode can be started promptly and can improve the fuel consumption.

Furthermore, the cooling water is heated in the heater, dissipates the heat in the heater core, and then flows into the engine. As a result, the temperature of the cooling water in the inlet of the engine can be relatively low. Therefore, the amount of heat transferring from the engine to the cooling water can be prevented from decreasing, and thus the amount of heat being dissipated from the engine to the atmosphere can be prevented from increasing. Thus, exhaust heat can be reduced, and the fuel consumption of the vehicle can be improved.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
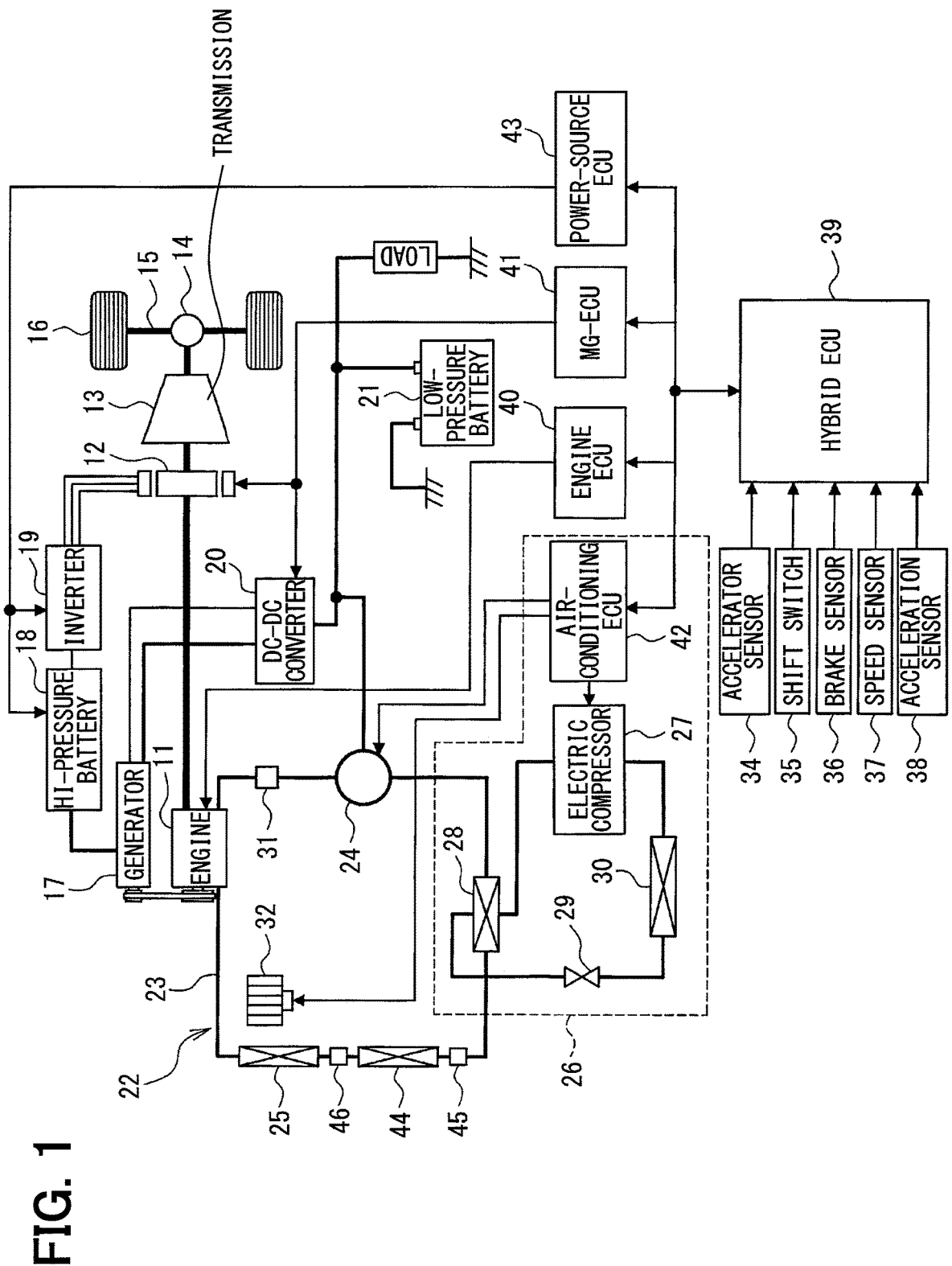
FIG. 1 is a schematic diagram of a control system in a hybrid vehicle according to a first embodiment.

Embodiments of the present disclosure will be described hereinafter referring to drawings. In the embodiments, a part that corresponds to or equivalents to a part described in a preceding embodiment may be assigned with the same reference number, and a redundant description of the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment will be described referring to FIG. 1 to FIG. 4. First, a schematic diagram of a control system in a hybrid vehicle will be described referring to FIG. 1.

The hybrid vehicle mounts an engine 11, i.e., an internal combustion engine, and a motor generator 12 that serve as power sources of the hybrid vehicle. The motor generator 12 will be referred to as MG 12 hereinafter. When an output shaft, i.e., a crank shaft, of the engine 11 generates power, the power transmits to a transmission 13 through the MG 12. An output shaft of the transmission 13 generates power, and the power transmits to wheels 16, i.e., drive wheels, through a component such as a differential gear mechanism 14 or a wheel axis 15. For example, the transmission 13 may be a variable transmission that includes a plurality of steps and shifts the steps one another to change a speed of the vehicle or may be a non-variable transmission (i.e., CVT) that changes the speed of the vehicle without shifting steps.

A rotary shaft of the MG 12 is connected to a power transmitting path, which is configured to transmit the power generated by the engine 11 to the wheels 16, to be transmittable the power. The rotary shaft is located between the engine 11 and the transmission 13 in the power transmitting path. A crutch may be mounted to the power transmitting path between the engine 11 and the MG 12 to stop and start the transmission of the power. The crutch may be located between the MG 12 and the transmission 13.

The engine 11 drives a generator 17. The power generated by the generator 17 is stored in a high-pressure battery 18. The MG 12 is operated by an inverter 19. The inverter 19 is connected to the high-pressure battery 18. Thus, the power is transferred between the MG 12 and the high-pressure battery 18 through the inverter 19. The generator 17 is connected to a low-pressure battery 21 through a DC-DC converter 20.

The high-pressure battery 18 and the low-pressure battery 21 are configured to store and supply the power and are in communication with each other through the DC-DC converter 20. The DC-DC converter 20 is connected to a low-pressure load that consumes the power supplying thereto from the high-pressure battery 18 through the DC-DC converter 20 or the power supplying thereto from the low-pressure battery 21.

The air conditioner for a vehicle in the present disclosure includes a heating device that is configured to perform a heating operation for heating a vehicle compartment. For example, the heating device may be a warm-water heating device 22 using the heat of the cooling water of the engine 11. The warm-water heating device 22 includes a cooling water circuit 23 that is configured to be connected to a coolant water path (i.e., a water jacket) of the engine 11 and that allows the cooling water therethrough in the heating operation. The cooling water circuit 23 mounts an electric water pump 24 and a heater core 25 for the heating operation.

Figure 2:
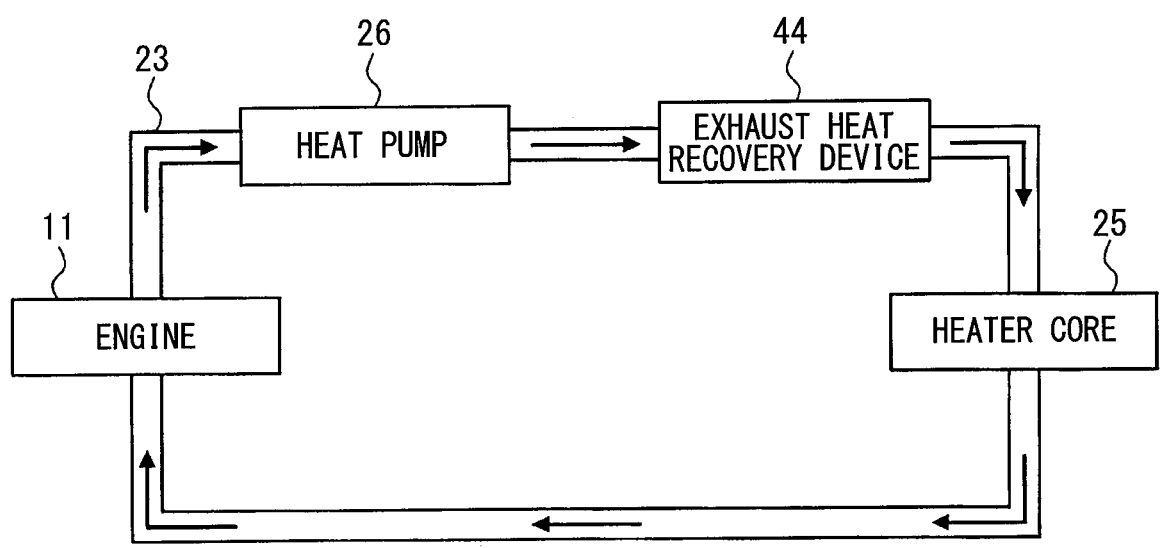
FIG. 2 is a schematic diagram of a cooling water circuit in a heating operation according to the first embodiment.

The cooling water circuit 23 mounts a heater that is configured to heat the cooling water. The heater is located downstream of the engine 11 and upstream of the heater core 25 in the cooling water circuit 23. In the first embodiment, the heater may include a heat pump 26 and an exhaust-heat recovery device 44. As shown in FIG. 1 and FIG. 2, the heat pump 26 is located downstream of the engine 11. The exhaust-heat recovery device 44 is located downstream of the heat pump 26. The heater core 25 is located downstream of the exhaust-heat recovery device 44.

As shown in FIG. 1, the electric water pump 24 is operated by the power from the low-pressure battery 21. The electric water pump 24 is configured to circulate the cooling water in the cooling water circuit 23. In the first embodiment, the cooling water flows through the engine 11, the heat pump 26, the exhaust-heat recovery device 44, the heater core 25 in this order, and returns to the engine 11 after flowing out of the heater core 25.

The heat pump 26 includes an electric compressor 27, a heater 28, an expansion valve 29, and an exterior heat exchanger 30. The electric compressor 27 is configured to compress a gas refrigerant having a low temperature and a low pressure to be a gas refrigerant having a high temperature and a high pressure. The heater 28 is configured to allow the high-temperature and high-pressure gas refrigerant to dissipate heat to be a high-pressure liquid refrigerant. The expansion valve 29 is configured to decompress and expand the high-pressure liquid refrigerant to be a low-temperature and low-pressure liquid refrigerant. The exterior heat exchanger 30 is configured to allow the low-temperature and low-pressure liquid refrigerant to absorb heat to be a low-temperature and low-pressure gas refrigerant.

The heater 28 of the heat pump 26 allows the refrigerant and the cooling water to exchange heat with each other therein and is configured to heat the cooling water using the heat of the refrigerant. The exhaust-heat recovery device 44 allows exhaust gas from the engine 11 and the cooling water to exchange heat with each other therein and is configured to heat the cooling water using the heat of the exhaust gas. On the other hand, the heater core 25 allows the cooling water and the air to exchange heat with each other therein and is configured to heat the air using the heat of the cooling water.

The heat pump 26 and the exhaust-heat recovery device 44 are arranged so as to improve the heat generation efficiency as a whole of the heating system. The operation efficiency of the heat pump 26 is improved as a temperature (i.e., an inlet temperature) of the cooling water flowing into the heat pump 26 falls. Therefore, the heat pump 26 is located close to the engine 11, for example, may be located upstream of the exhaust-heat recovery device 44. The operation efficiency of the exhaust-heat recovery device 44 is also improved as a temperature (i.e., an inlet temperature) of the cooling water flowing into the exhaust-heat recovery device 44 falls. The operation efficiencies may deteriorate due to the inlet temperatures. However, a degree of the deterioration in the operation efficiency of the exhaust-heat recovery device 44 is less than a degree of the deterioration in the operation efficiency of the heat pump 26 because a temperature of the exhaust gas is high. In addition, the exhaust-heat recovery device 44 uses free heat (i.e., the heat of the exhaust gas). On the other hand, the heat pump 26 uses a paid heat. For example, the paid heat may be heat generated by consuming the electric power. Therefore, the operation efficiency of the heat pump 26 is ignored considering the fuel consumption, and the exhaust-heat recovery device 44 is located downstream of the heat pump 26.

The cooling water circuit 23 mounts an engine-outlet temperature sensor 31 that is configured to detect a temperature (i.e., an engine-outlet water temperature) of the cooling water flowing out of the engine 11. A blower fan 32, which is configured to blow warm air, is disposed near the heater core 25. The cooling water circuit 23 further mounts an HER-inlet temperature sensor 45 and an EHR outlet temperature sensor. The EHR-inlet temperature sensor 45 is configured to detect a temperature (i.e., EHR-inlet water temperature) of the cooling water flowing into the exhaust-heat recovery device 44. The EHR outlet temperature sensor 46 is configured to detect a temperature (i.e., EHR-outlet water temperature) of the cooling water flowing out of the exhaust-heat recovery device 44.

An accelerator sensor 34 is configured to detect an opening degree of an accelerator. The opening degree of the accelerator is, i.e., an operation degree of a gas pedal. A shift switch 35 is configured to detect a location of a shift lever. A brake switch 36 is configured to detect an operation of the brake. Alternatively, a brake sensor may be disposed to detect the operation amount of the brake. A speed sensor 37 is configured to detect a speed of the vehicle. An acceleration sensor 38 is configured to detect a degree of the acceleration.

A hybrid ECU 39 is mounted as a controller that is configured to control the vehicle as a whole. Specifically, the hybrid ECU 39 is configured to read output signals from the above-described various sensors and switches and to determine an operation state of the vehicle based on the output signals. The hybrid ECU 39 is configured to send and receive control signals and data signals between the hybrid ECU 39 and an engine ECU 40 and between the hybrid ECU 39 and an air conditioning ECU 42.

The engine ECU 40 is a controller that is configured to control an operation of the engine 11. MG-ECU 41 is a controller that is configured to control the inverter 19 to control the MG 12 and to control the generator 17 and the DC-DC converter 20. The air conditioning ECU 42 is a controller that is configured to control the warm-water heating device 22. For example, the warm-water heating device 22 may include the electric water pump 24, the electric compressor 27, and the blower fan 32.

The hybrid ECU 39 is configured to send the control signals and the data signals to the ECUs 40, 41, 42 and receives the control signals and the data signals from the ECUs 40, 41, 42. Thus, the hybrid ECU 39 is configured to control the engine 11, the MG 12, the generator 17, the DC-DC converter 20, and the warm-water heating device 22 based on the operation state of the vehicle. In addition, the hybrid ECU 39 is also configured to send the control signals and the data signals to a power-source ECU 43 and receives the controls signals and the data signals from the power-source ECU 43. The power-source ECU 43 is configured to monitor the high-pressure battery 18.

The hybrid ECU 39 is configured to switch driving modes, for example, may be among an engine mode, an assist mode, and an EV mode. In the engine mode, the vehicle moves by operating the wheels 16 using only the power from the engine 11. In the assist mode, the vehicle moves by operating the wheels 16 using both of the power from the engine 11 and the power from the MG 12. In the EV mode, the vehicle moves by operating the wheels 16 using only the power from the MG 12. For example, the hybrid ECU 39 may allow the EV mode to be started when the temperature of the cooling water in the outlet of the engine 11 becomes a warm-up stoppable temperature, at which the engine 11 is allowed to be stopped, or higher.

The hybrid ECU 39 is configured to set the driving mode to a power regeneration mode when braking the vehicle. For example, the hybrid ECU 39 may operate the power regeneration mode when generating the braking force while the gas pedal is not operated or while the brake pedal is operated. In the power regeneration mode, the power from the wheels 16 operates the MG 12 such that the MG 12 converts the kinetic energy of the vehicle into the electric energy to generate the regenerated power. The regenerated power, i.e., the regenerated electric power, is stored in the high-pressure battery 18. As a result, time durations in which the assist mode and the EV mode are operated can be longer, and therefore the fuel consumption can be improved.

The output of the exhaust-heat recovery device 44 varies depending on, e.g., operation states of the engine 11. The output is, in other words, an amount of heat used by the exhaust-heat recovery device 44 to heat the cooling water. Thus, in the first embodiment, the hybrid ECU 39 performs a heating control routine, which is described later, shown in FIG. 3 to perform the following control.

The hybrid ECU 39 calculates the output of the exhaust-heat recovery device 44 based on the EHR-inlet water temperature detected by the EHR-inlet temperature sensor 45 and the EHR-outlet water temperature detected by the EHR-outlet temperature sensor 46. The hybrid ECU 39 adjusts the output of at least one selected from a group of the heat pump 26, the electric heater 47, and a combustion heater 49 based on the output of the exhaust-heat recovery device 44. In the present embodiment, the heater includes the exhaust-heat recovery device 44 and the heat pump 26. That is, the hybrid ECU 39 adjusts the output of the heat pump 26 based on the output of the exhaust-heat recovery device 44.

The heating control routine shown in FIG. 3, which is performed by the hybrid ECU 39, will be described in detail hereinafter.

Figure 3:
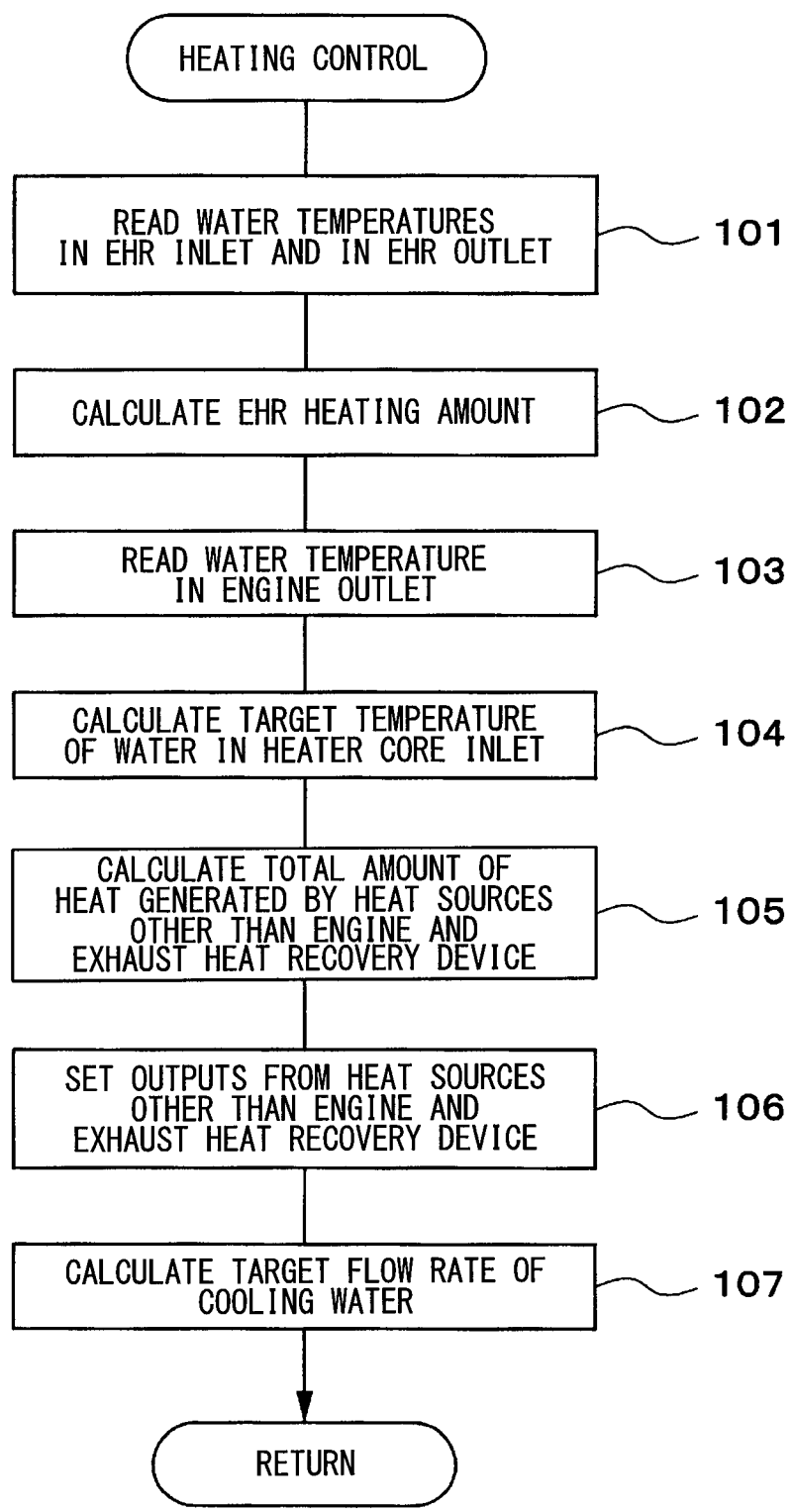
FIG. 3 is a flow chart showing a heating control routine according to the first embodiment.

The heating control routine shown in FIG. 3 is performed repeatedly at specific intervals while the hybrid ECU 39 is on. The heating control routine serves as an output controller.

When the heating control routine is started, the hybrid ECU 39 reads the EHR-inlet water temperature and the EHR-outlet water temperature at the section 101. In the present embodiment, the temperature of the cooling water in the inlet of the exhaust-heat recovery device 44 detected by the EHR-inlet temperature sensor 45 is read as the EHR-inlet water temperature, and the temperature of the cooling water in the outlet of the exhaust-heat recovery device 44 detected by the EHR-outlet temperature sensor 46 is read as the EHR-outlet water temperature. Alternatively, for example, a shifting average value of the EHR-inlet water temperature detected by the EHR-inlet temperature sensor 45 from a specified period before may be obtained as the EHR-inlet water temperature. Similarly, a shifting average value of the EHR-outlet water temperature detected by the EHR-outlet temperature sensor 46 from a specified period before may be obtained as the EHR-outlet water temperature.

The heating control routine advances from the section 101 to the section 102. In the section 102, the hybrid ECU 39 calculates the EHR heating amount [kW] based on the EHR-inlet water temperature and the EHR-outlet water temperature. The EHR heating amount is, in other words, the output of the exhaust-heat recovery device 44 or the amount of heat used by the exhaust-heat recovery device 44 to heat the cooling water. Specifically, the hybrid ECU 39 calculates an EHR temperature difference between the EHR-inlet water temperature and the EHR-outlet water temperature, and then calculates the EHR heating amount based on the EHR temperature difference, a specific heat of the cooling water, and the flow rate of the cooling water by using the following formula F1.

EHR HEATING AMOUNT=EHR TEMPERATURE DIFFERENCE×SPECIFIC HEAT×FLOW RATE (F1)

The flow rate of the cooling water used in the formula F1 may be a present value of the flow rate when the EHR-inlet water temperature and the EHR-outlet water temperature are the present values. Alternatively, the flow rate of the cooling water used in the formula F1 may be the shifting average value when the EHR-inlet water temperature and the EHR-outlet water temperature are the shifting average value.

The heating control routine advances to the section 103 after the section 102. In the section 103, the hybrid ECU 39 reads, as the engine-outlet water temperature, the present value of the cooling water in the outlet of the engine 11 detected by the engine-outlet temperature sensor 31.

The heating control routine advances to the section 104 from the section 103. In the section 104, the hybrid ECU 39, using a map or a formula, calculates a target inlet temperature of the heater core 25 based on the outside temperature, the inside temperature of the vehicle compartment, and the target inside temperature of the vehicle compartment. The target inlet temperature of the heater core 25 is, in other words, a target temperature of the cooling water to be heated. The target inlet temperature of the heater core 25 may be a target value of the heater-core-inlet water temperature, i.e., a target temperature of the cooling water flowing into the heater core 25.

The heating control routine advances to the section 105 from the section 104. In the section 105, the hybrid ECU 39 calculates, using the following formula F2, a total amount of heat [kW] of the heater other than the engine 11 and the exhaust-heat recovery device 44 based on the target heater-core-inlet water temperature, the engine-outlet water temperature, the specific heat of the cooling water, the flow rate of the cooling water, and the EHR heating amount. The total amount of heat is a necessary amount to raise the heater-core-inlet water temperature to the target value. In the formula F2, the flow rate of the cooling water is the present value.

TOTAL AMOUNT OF HEAT=(TARGET HEATER-CORE-INLET WATER TEMPERATURE−ENGINE-OUTLET WATER TEMPERATURE)× SPECIFIC HEAT×FLOW RATE−EHR HEATING AMOUNT (F2)

The heating control routine advances to the section 106 after the section 105. In the section 106, the hybrid ECU 39 sets the output of the heater other than the engine 11 and the exhaust-heat recovery device 44. In the first embodiment, the heater includes only the heat pump 26. Accordingly, the total amount of heat calculated in the section 105 becomes the output of the heat pump 26, i.e., becomes the amount of heat used by the heat pump 26 to heat the cooling water. Thus, the output of the heat pump 26 is adjusted based on the output of the exhaust-heat recovery device 44. For example, when the heater other than the engine 11 and the exhaust-heat recovery device 44 includes a plurality of devices, the total amount of heat calculated in the section 105 may be distributed to the plurality of devices and the outputs of the plurality of devices may be set.

Figure 4:
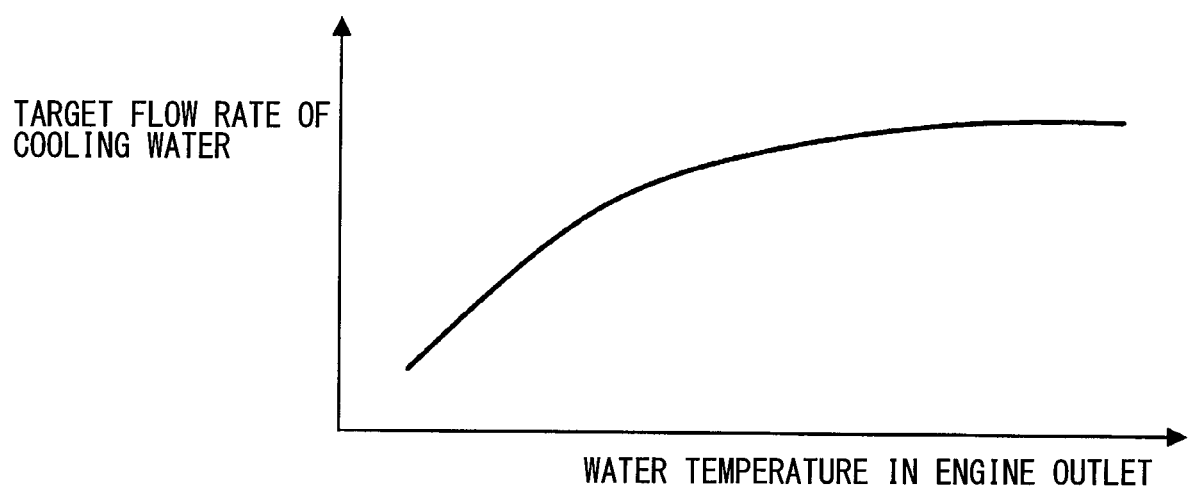
FIG. 4 is a graph showing an example of a concept how a target flow rate of the cooling water shifts.

The heating control routine advances to the section 107 after the section 106. In the section 107, the hybrid ECU 39 calculates, e.g., may be using a map or a formula, a target flow rate of the cooling water based on the engine-outlet water temperature. As shown in FIG. 4, the map or the formula used to calculate the target flow rate may be set such that the target flow rate decreases as the engine-outlet water temperature falls. The hybrid ECU 39 controls the electric water pump 24 such that the flow rate of the cooling water becomes the target flow rate. As a result, the hybrid ECU 39 decreases the engine-inlet water temperature by decreasing the flow rate of the cooling water circulating through the cooling water circuit 23 as the engine-outlet water temperature falls. The engine-inlet water temperature is, in other words, a temperature of the cooling water flowing into the engine 11. Thus, the section 107, including the above-described processes, serves as the flow rate controller.

The heater-core-outlet water temperature, i.e., a temperature of the cooling water flowing out of the heater core 25, may be expressed by the following formula F3.

HEATER-CORE-OUTLET WATER TEMPERATURE=HEATER-CORE-INLET WATER TEMPERATURE−OUTPUT OF HEATER CORE/SPECIFIC HEAT/FLOW RATE (F3)

As obvious from the formula F3, the heater-core-outlet water temperature falls by decreasing the flow rate of the cooling water when the output of the heater core and the heater-core-inlet water temperature are fixed. Here, no heater is arranged downstream of the heater core 25. In other words, no heater is located between the heater core 25 and the engine 11. Therefore, the engine-inlet water temperature becomes substantially the same as the heater-core-outlet water temperature or becomes lower than the heater-core-outlet water temperature. As a result, the engine-inlet water temperature can be decreased by decreasing the flow rate of the cooling water.

In the first embodiment, the heater, which heats the cooling water, is mounted to the cooling water circuit 23 downstream of the engine 11 and upstream of the heater core 25. Specifically, the heater includes the heat pump 26, the exhaust-heat recovery device 44. The heat pump 26 is located downstream of the engine 11, the exhaust-heat recovery device 44 is located downstream of the heat pump 26, and the heater core 25 is located downstream of the exhaust-heat recovery device 44.

According to the above-described configuration, the heater, i.e., the heat pump 26 and the exhaust-heat recovery device 44, heats the cooling water from the engine 11, and the heated cooling water, which is heated in the heater, flows into the heater core 25. The cooling water heated in the heater has a temperature higher than the engine-outlet water temperature.

As a result, it is not necessary to increase the engine-outlet water temperature to a required temperature of the heater-core-inlet water temperature, and thus the warm-up stoppable temperature, at which the engine 11 is allowed to be stopped, can be relatively low. The required temperature is, in other words, the target heater-core-inlet water temperature. That is, the warm-up stoppable temperature can be set lower than the target heater-core-inlet water temperature. Therefore, when the EV mode in which the vehicle moves using the power from the MG 12 while stopping the engine 11 is operable in the vehicle, the EV mode is allowed to be performed promptly and thus the fuel consumption in the EV mode can be improved.

In addition, the cooling water is heated in the heater, dissipates the heat in the heater core 25, and then flows into the engine 11. Accordingly, the engine-inlet water temperature can become relatively low. As a result, the amount of heat transferring from the engine 11 to the cooling water can be reduced, and thus the amount of heat transferring from the engine 11 to the atmosphere can be prevented from increased. Therefore, the waste heat can be reduced, and thus the fuel consumption of the vehicle can be improved.

In the present embodiment, the hybrid ECU 39 adjusts the output of the heat pump 26 based on the output of the exhaust-heat recovery device 44. As a result, a cause of the variation of the heater-core-inlet water temperature can be suppressed in a manner that the output of the heat pump 26 is adjusted based on the output of the exhaust-heat recovery device 44, even when the output of the exhaust-heat recovery device 44 is changed, e.g., depending on the operation states of the engine 11. Moreover, a cause of the waste heat generated by the heat pump 26 can be suppressed. That is, most of the energy, which is necessary to perform the heating operation, is provided by the heat from the engine 11, i.e., by the heat of the exhaust gas, and the heat pump 26 ekes out the rest of the energy without being operated unnecessarily. Thus, the fuel consumption can be improved.

Furthermore, in the first embodiment, the hybrid ECU 39 calculates the output of the exhaust-heat recovery device 44 based on the EHR-inlet water temperature detected by the EHR-inlet temperature sensor 45 and the EHR-outlet water temperature detected by the EHR-outlet temperature sensor 46. Accordingly, the output of the exhaust-heat recovery device 44 can be calculated with high accuracy based on the actual temperatures detected by the temperature sensors 45 and 46.

In the first embodiment, the engine-inlet water temperature is decreased in a manner that the flow rate of the cooling water circulating through the cooling water circuit 23 as the engine-outlet water temperature falls. Accordingly, the amount of heat dissipated from the engine 11, e.g., and from pipes that allow the cooling water to flow therethrough, can be reduced by increasing the amount of heat transferred from the engine 11 to the cooling water. As a result, the waste heat can be reduced, and thus the fuel consumption can be improved.

Second Embodiment

A second embodiment will be described hereafter referring to FIG. 5. In the second embodiment, parts different from the first embodiment will be described mainly.

In the second embodiment, at least one of the EHR-inlet temperature sensor 45 and the EHR-outlet temperature sensor 46 is omitted from the above-configuration of the first embodiment shown in FIG. 1. In addition, the hybrid ECU 39 operates a heating control routine shown in FIG. 5 to estimate the output of the exhaust-heat recovery device 44 based on the output of the engine 11. The output of the exhaust-heat recovery device 44 is, in other words, the amount of heat used by the exhaust-heat recovery device 44 to heat the cooling water.

Figure 5:
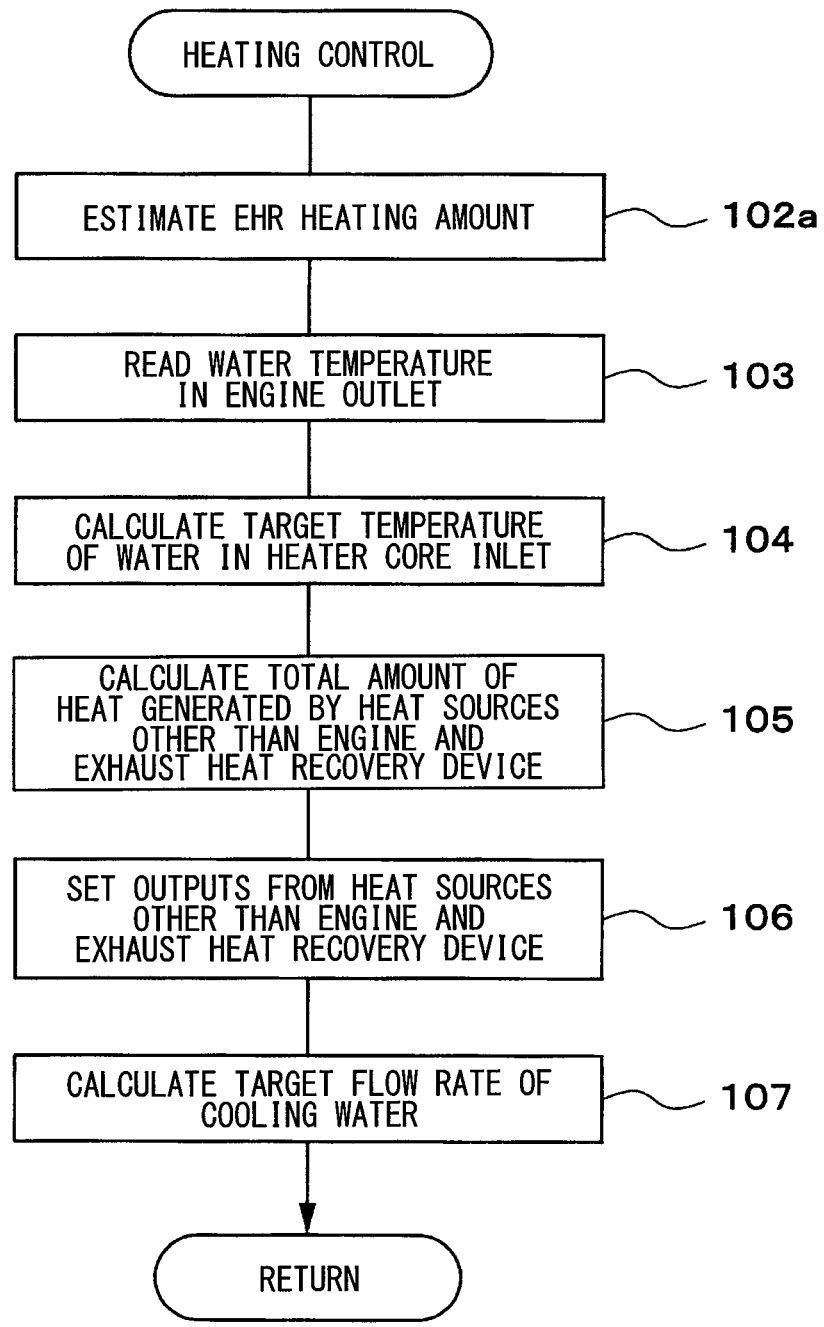
FIG. 5 is a flow chart showing a heating control routine according to a second embodiment.

In the heating control routine shown in FIG. 5, the section 101 of the heating control routine shown in FIG. 3 is omitted, and the section 102a is performed instead of the section 102. Other sections are the same as those of the first embodiment shown in FIG. 3.

The heating control routine, which is performed by the hybrid ECU 39 in the second embodiment, shown in FIG. 5 will be described in detail hereinafter. The heating control routine shown in FIG. 5 may serve as the output controller.

In the heating control routine shown in FIG. 5, the hybrid ECU 39 estimates the EHR heating amount [kW], which is the output of the exhaust-heat recovery device 44, based on the output of the engine 11 in the section 102a. Specifically, the hybrid ECU 39 calculates EHR warm-up coefficient g(Pe) based on the engine output Pe, for example, by using a map or a formula. The engine output Pe is a time-averaged output of the engine 11 from a time point at which the engine 11 is started.

Subsequently, the hybrid ECU 39 calculates, e.g., by using a map or a formula, an exhaust-gas heat amount f(Ne, Te, Ke) based on an engine rotational speed Ne, an engine torque Te, and the engine-outlet water temperature Ke. The hybrid ECU 39 further calculates the EHR heating amount using the exhaust-gas heat amount f(Ne, Te, Ke) and the EHR warm-up coefficient g(Pe) by using the following formula F4.

$$\text{EHR HEATING AMOUNT} = f(NE, Te, Ke) \times g(Pe) \quad (F4)$$

The heating control routine advances to the section 103 after the section 102a. In the section 103, the hybrid ECU 39 reads, as the engine-outlet water temperature, the current value of the temperature of the cooling water in the outlet of the engine 11 detected by the engine-outlet temperature sensor 31. The heating control routine advances to the section 104 after the section 103. In the section 104, the hybrid ECU 39 calculates, e.g., by using the map or the formula, the target heater-core-inlet water temperature based on the outside temperature, the inside temperature inside the vehicle compartment, and the target inside temperature of the vehicle compartment.

The heating control routine advances to the section 105 after the section 104. In the section 104, the hybrid ECU 39 calculates the total amount of heat of the heater other than the engine 11 and the exhaust-heat recovery device 44 by using the target heater-core-inlet water temperature, the engine-outlet water temperature, the specific heat of the cooling water, and the flow rate of the cooling water. The heating control routine advances to the section 106 after the section 105. In the section 106, the hybrid ECU 39 sets the output of the engine 11 and the output of the heater other than the exhaust-heat recovery device 44.

The heating control routine advances to the section 107 after the section 106. In the section 107, the hybrid ECU 39 calculates, e.g., by using the map or the formula, the target flow rate of the cooling water based on the engine-outlet water temperature.

In the second embodiment, the hybrid ECU 39 estimates the output of the exhaust-heat recovery device 44 based on the output of the engine 11. Accordingly, at least one of the EHR-inlet temperature sensor 45 and the EHR-outlet temperature sensor 46 can be omitted, and thus the system can be provided with a low cost.

Third Embodiment

A third embodiment will be described hereafter referring to FIG. 6. In the third embodiment, parts different from the first embodiment will be described.

Figure 6:
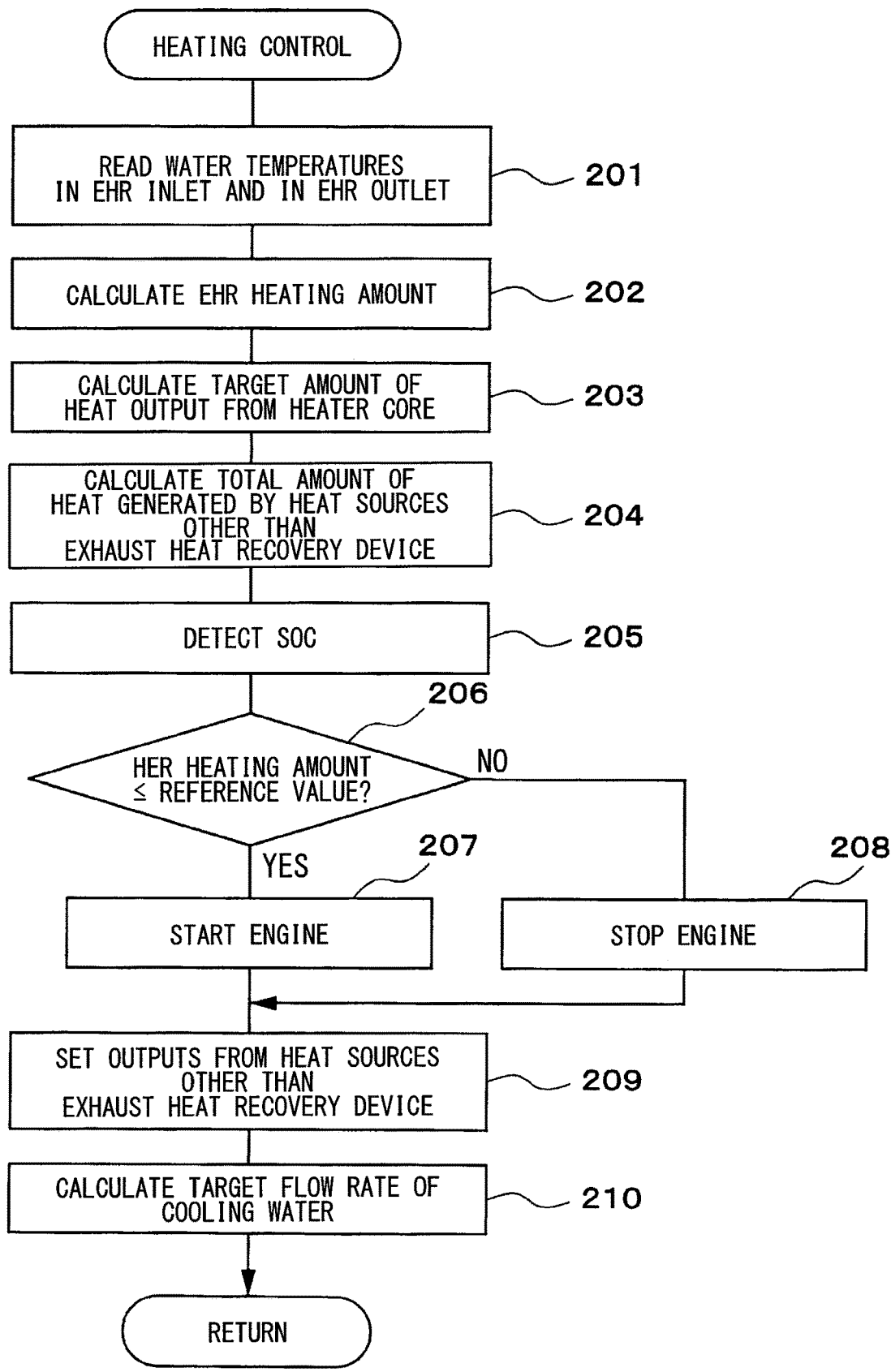
FIG. 6 is a flow chart showing a heating control routine according to a third embodiment.

In the third embodiment, the hybrid ECU 39 operates a heating control routine shown in FIG. 6 such that the operation states of the engine 11 is switched between being on and being off based on the output of the exhaust-heat recovery device 44. The output of the exhaust-heat recovery device 44 is, in other words, the amount of heat used by the exhaust-heat recovery device 44 to heat the cooling water.

The heating control routine, which is operated by the hybrid ECU 39 in the third embodiment, shown in FIG. 6 will be described in detail hereafter. The heating control routine shown in FIG. 6 may serve as the output controller.

In the heating control routine shown in FIG. 6, the hybrid ECU 39 reads the EHR-inlet water temperature and the EHR-outlet water temperature in the section 201. The section 201 corresponds to the section 101 shown in FIG. 3.

The heating control routine advances to the section 202 after the section 201. In the section 202, the hybrid ECU 39 calculates the EHR heating amount based on the EHR-inlet water temperature and the EHR-outlet water temperature.

The section 202 corresponds to the section 102 shown in FIG. 3.

The heating control routine advances to the section 203 after the section 202. In the section 203, the hybrid ECU 39 calculates, e.g., by using a map or a formula, the target amount of heat [kW] output by the heater core 25 based on the outside temperature, inside temperature inside the vehicle compartment, and the target inside temperature of the vehicle compartment.

The heating control routine advances to the section 204 after the section 203. In the section 204, the hybrid ECU 39 calculates, by using the following formula F5, the total amount of heat [kW] of the heater other than the exhaust-heat recovery device 44 based on the target amount of heat output by the heater core 25 and the EHR heating amount.

TOTAL AMOUNT OF HEAT=TARGET AMOUNT OF HEAT OUTPUT BY HEATER CORE−EHR HEATING AMOUNT  (F5)

The heating control routine advances to the section 205 after the section 204. In the section 205, the hybrid ECU 39 determines SOC that shows a remaining capacity of the high-pressure battery 18. The SOC is defined by the following formula F6.

SOC=REMAINING CAPACITY/FULL-CHARGED CAPACITY×100  (F6)

The heating control routine advances to the section 206 after the section 205. In the section 206, the hybrid ECU 39 determines whether the EHR heating amount is a reference value or lower. The reference value may be calculated, e.g., by using a map or a formula, based on the speed of the vehicle and the SOC of the high-pressure battery 18. The map or the formula with which the reference value is calculated is set such that the reference value rises as the speed of the vehicle increases and the SOC of the high-pressure battery 18 increases.

The heating control routine advances to the section 207 when the hybrid ECU 39 determines that the EHR heating amount is the reference value or lower in the section 206. In the section 207, the hybrid ECU 39 switches the engine 11 from being off to being on or continues to operate the engine 11. On the other hand, the heating control routine advances to the section 208 when the hybrid ECU 39 determines that the EHR heating amount is larger than the reference value. In the section 208, the hybrid ECU 39 switches the engine 11 from being on to being off or continues to stop the engine 11. The sections 206 to 208 including the above-described processes may serve as the switching controller.

The heating control routine advances to the section 209 after the section 208. In the section 209, the hybrid ECU 39 sets the output of the heater other than the exhaust-heat recovery device 44. The heater other than the exhaust-heat recovery device 44 includes the engine 11 and the heat pump 26.

While the engine 11 is operated, the hybrid ECU 39 distributes the total amount of heat calculated in the section 204 to the engine 11 and the heat pump 26 and sets the output of the engine 11 and the output of the heat pump 26. The output of the engine 11 is, in other words, the amount of heat used by the engine 11 to heat the cooling water. The output of the heat pump 26 is, in other words, the amount of heat used by the heat pump 26 to heat the cooling water. In this situation, the hybrid ECU 39 calculates, e.g., by using a map or a formula, the distribution rate based on the SOC of the high-pressure battery 18, and then distributes the total amount of heat to the engine 11 and the heat pump 26 with the distribution rate and sets the outputs of the engine 11 and the heat pump 26.

The map or the formula, with which the distribution rate is calculated, is set such that the ratio of the output of the heat pump 26 increases as the SOC of the high-pressure battery 18 increases, i.e., such that the ratio of the output of the engine 11 increases as the SOC of the high-pressure battery 18 decreases. Thus, the outputs of the engine 11 and the heat pump 26 are adjusted based on the SOC of the high-pressure battery 18.

On the other hand, while the engine 11 is stopped, the total amount of heat calculated in the section 204 becomes the output of the heat pump 26. The section 209 including the above-described processes may serve as the output controller.

The heating control routine advances to the section 210 after the section 209. In the section 210, the hybrid ECU 39 calculates the target flow rate of the cooling water based on the engine-outlet water temperature. The section 210 corresponds to the section 107 shown in FIG. 3.

In the third embodiment, the operation states of the engine 11 are switched between being on and being off based on the output of the exhaust-heat recovery device 44. Specifically, the hybrid ECU 39 starts the engine 11 when determining the EHR heating amount, which is calculated as the output of the exhaust-heat recovery device 44, to be the reference value or lower, and stops the engine 11 when determining the EHR heating amount to be larger than the reference value. Accordingly, the hybrid ECU 39 increases the output of the exhaust-heat recovery device 44 by starting the engine 11 when the output of the exhaust-heat recovery device decreases, e.g., while the engine 11 is stopped in heavy traffic. As a result, the output of the heat pump 26 can be prevented from being increased.

For example, the output of the heat pump 26 may be increased because the exhaust pipe of the engine 11 is cooled and therefore the exhaust-heat recovery device 44 starts serving as a radiator when the EV mode is operated for a long time, e.g., in the heavy traffic. Then, in the third embodiment, the operation states of the engine 11 are switched between being on and being off such that the amount of heat output from the exhaust-heat recovery device 44 is kept to be a specified value or higher. Conventionally, when a load applied to the engine 11 is low, e.g., in the heavy traffic, the EV mode is continued until the SOC of the high-pressure battery 18 becomes a lower limit value, and then the engine 11 is kept to be operated until the SOC of the high-pressure battery 18 increases to a specified value. However, the exhaust pipe of the engine 11 is cooled in this situation, therefore it is considered to switch the operation states of the engine 11 between being on and being off based on the output of the exhaust-heat recovery device 44.

In the present embodiment, the engine 11 is started when the output of the exhaust-heat recovery device 44 falls such that the generator 17, which is operated using the power from the engine 11, generates power positively. Accordingly, the electric power consumed in the EV mode is recovered. In addition, a deterioration of the performance of the engine 11, which is caused by operating the engine 11 mandatorily, can be suppressed, and the increase of the output of the heat pump 26, which is caused when heat generation is increased, can be suppressed. As a result, the fuel consumption of the vehicle can be improved as compared with a case where the exhaust-heat recovery device 44 is located downstream of the heater core 25.

It may be better to operate the engine 11 while the vehicle moves because the engine 11 generates power with low efficiency while the vehicle is stopped and because the volume of ram air is small therefore the exhaust pipe is hardly cooled while the vehicle is stopped. Accordingly, the reference value, which is compared with the output of the exhaust-heat recovery device 44 to start the engine 11, is set small while the vehicle moves. In contrast, the reference value is set large such that the engine 11 is not started while the high-pressure battery 18 is not electrifiable, i.e., while the SOC of the high-pressure battery 18 is close to the upper limit value.

In addition, the outputs of the engine 11 and the heat pump 26 are adjusted based on the SOC of the high-pressure battery 18 in the third embodiment. Specifically, the ratio of the output of the heat pump 26 is increased as the SOC of the high-pressure battery 18 increases. In other words, the ratio of the output of the engine 11 is increased as the SOC of the high-pressure battery 18 decreases. Accordingly, when the SOC of the high-pressure battery 18 is low, the output of the engine 11 is increased such that the power generated by the generator 17, which is operated by the power from the engine 11, increases and that the amount of heat generated by the engine 11 is increased. As a result, the output of the heat pump 26 can be reduced while the SOC of the high-pressure battery 18 is increased. On the other hand, when the SOC of the high-pressure battery 18 is high, the output of the heat pump 26 can be increased without increasing the output of the engine 11. Thus, sufficient amount of heat, which is required to perform the heating operation, can be provided with a small volume of fuel.

In the third embodiment, the hybrid ECU 39 calculates the output of the exhaust-heat recovery device 44 based on the EHR-inlet water temperature detected by the EHR-inlet temperature sensor 45 and the EHR-outlet water temperature detected by the EHR-outlet temperature sensor 46. However, the output of the exhaust-heat recovery device 44 may be estimated based on the output of the engine 11.

In the above-described first, second, and third embodiments, the exhaust-heat recovery device 44 is located downstream of the heat pump 26. However, the heat pump 26 may be located downstream of the exhaust-heat recovery device 44.

Fourth Embodiment

Figure 7:
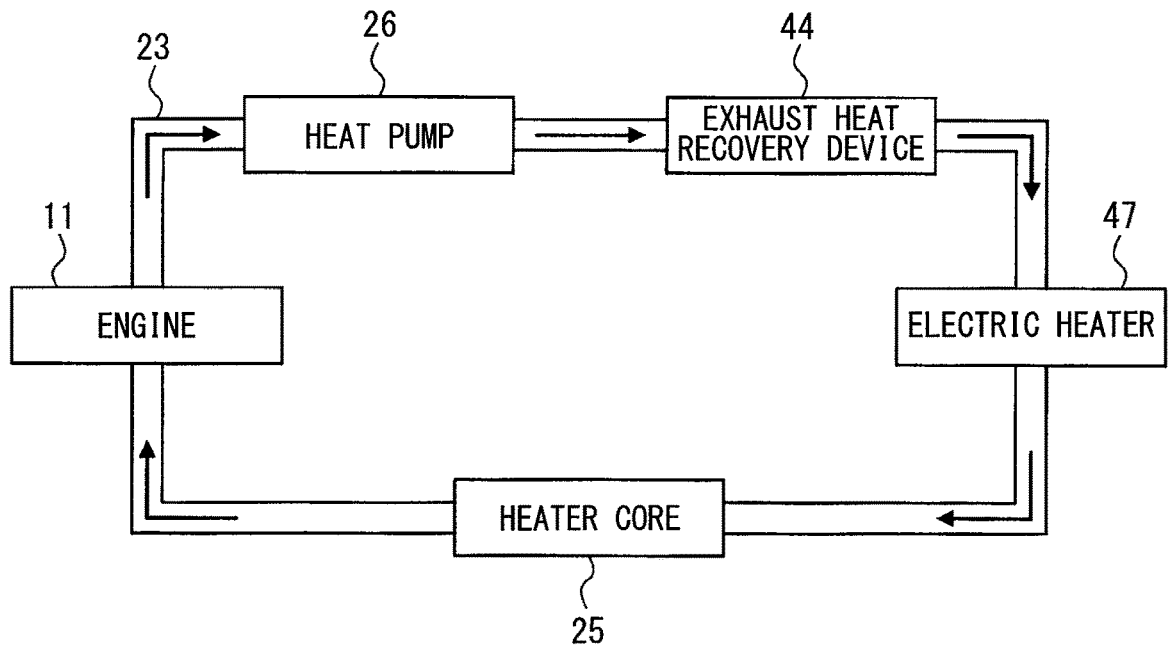
FIG. 7 is a schematic diagram of a cooling water circuit in a heating operation according to a fourth embodiment.

A fourth embodiment will be described hereafter referring to FIG. 7. In the fourth embodiment, parts different from the first embodiment will be described.

In the fourth embodiment, the heater includes the heat pump 26, the exhaust-heat recovery device 44, and the electric heater 47. As shown in FIG. 7, the heat pump 26, the exhaust-heat recovery device 44, and the electric heater 47 are located downstream of the engine 11 and upstream of the heater core 25. The heat pump 26 and the electric heater 47 are electric heat sources. The electric heater 47 heats the cooling water. For example, the electric heater 47 may be a PTC heater, a carbon heater, or a sheathed heater.

The heat pump 26 is located downstream of the engine 11. The exhaust-heat recovery device 44 is located downstream of the heat pump 26. The electric heater 47 is located downstream of the exhaust-heat recovery device 44. The heater core 25 is located downstream of the electric heater 47. That is, in the fourth embodiment, the electric heater 47 is added to the configuration of the first embodiment. In the fourth embodiment, the cooling water is allowed to flow through the engine 11, the heat pump 26, the exhaust-heat recovery device 44, the electric heater 47, and the heater core 25 in this order and then returns to the engine 11 from the heater core 25.

The electric heater 47 can be operated stably since the electric heater 47 does not rely on the heater-core inlet water temperature, and therefore the heater-core inlet water temperature is easily controlled. Therefore, the electric heater 47 is located immediately upstream of the heater core 25 such that the heater-core-inlet water temperature becomes the target value with minimum output.

The fourth embodiment can obtain the same effects as the first embodiment since the heater is located downstream of the engine 11 and upstream of the heater core 25.

In the fourth embodiment, the output of the electric heat source, i.e., the outputs of the heat pump 26 and the electric heater 47, may be adjusted based on the output of the exhaust-heat recovery device 44. Alternatively, the output of the electric heat source, i.e., the outputs of the heat pump 26 and the electric heater 47, may be adjusted based on the SOC of the high-pressure battery 18.

Fifth Embodiment

A fifth embodiment will be described hereafter referring to FIG. 8. In the fifth embodiment, parts different from the first embodiment will be described.

Figure 8:
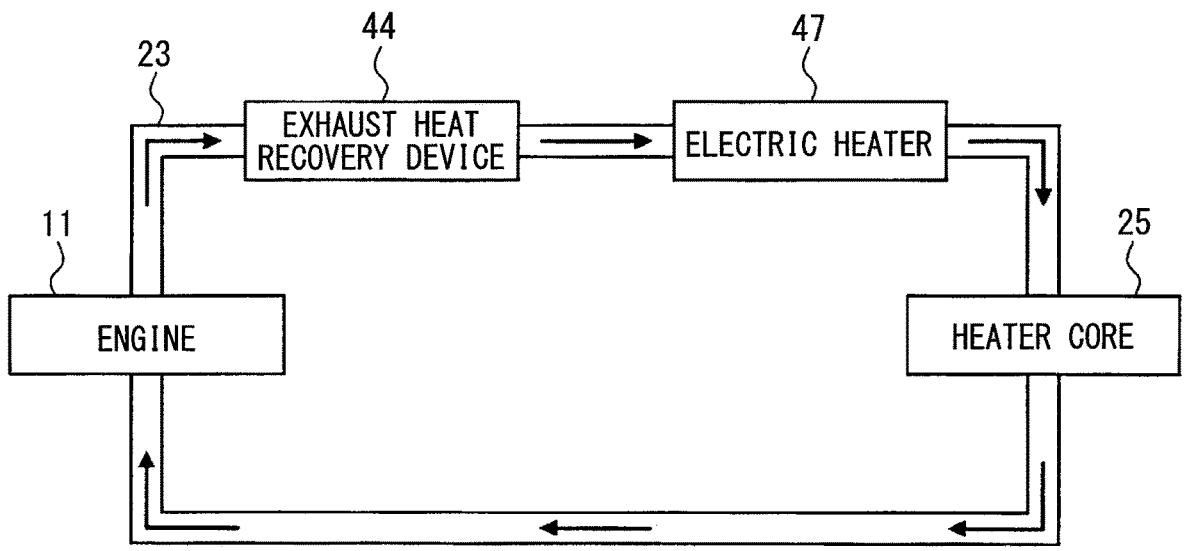
FIG. 8 is a schematic diagram of a cooling water circuit in a heating operation according to a fifth embodiment.

In the fifth embodiment, as shown in FIG. 8, the heater includes the exhaust-heat recovery device 44 and the electric heater 47. The exhaust-heat recovery device 44 and the electric heater 47 are located downstream of the engine 11 and upstream of the heater core 25. The exhaust-heat recovery device 44 is located downstream of the engine 11. The electric heater 47 is located downstream of the exhaust-heat recovery device 44. The heater core 25 is located downstream of the electric heater 47. That is, in the fifth embodiment, the heat pump 26 is omitted from the configuration of fourth embodiment. In the fifth embodiment, the cooling water is allowed to flow through the engine 11, the exhaust-heat recovery device 44, the electric heater 47, and the heater core 25 in this order and then returns to the engine 11 from the heater core 25.

The fifth embodiment can provide the same effects as the first embodiment since the heater is located downstream of the engine 11 and upstream of the heater core 25.

In the fifth embodiment, the output of the electric heater 47 may be adjusted based on the output of the exhaust-heat recovery device 44. Alternatively, the output of the engine 11 and the output of the electric heater 47 may be adjusted based on the SOC of the high-pressure battery 18.

Sixth Embodiment

Figure 9:
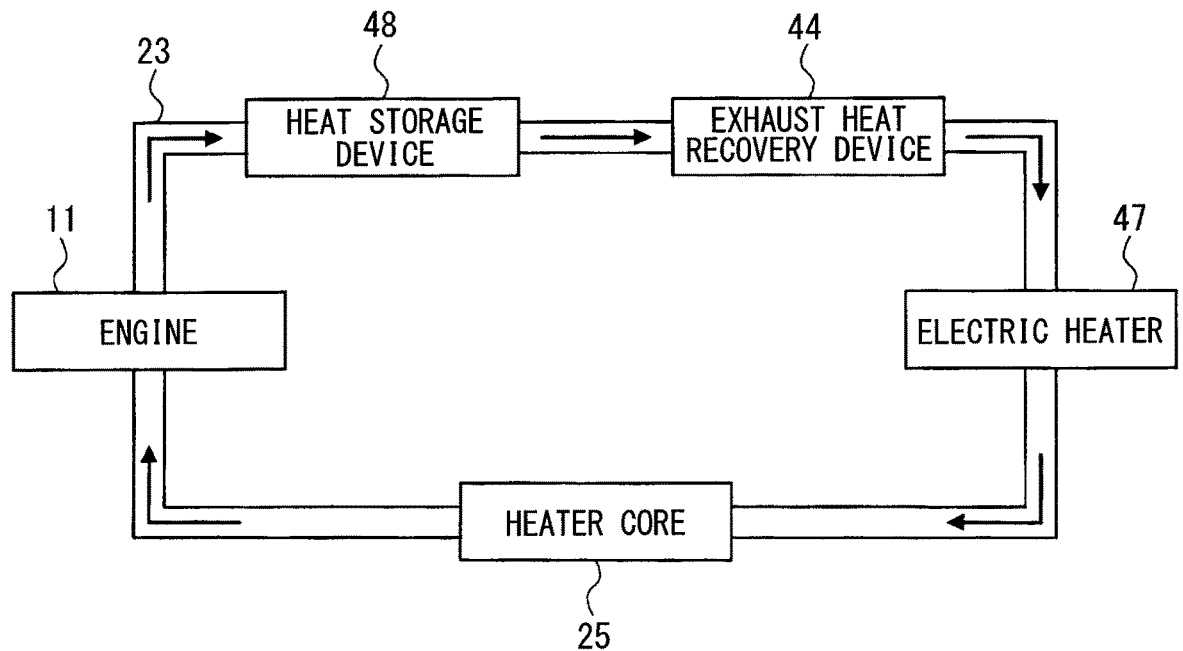
FIG. 9 is a schematic diagram of a cooling water circuit in a heating operation according to a sixth embodiment.

A sixth embodiment will be described hereafter referring to FIG. 9. In the sixth embodiment, parts different from the first embodiment will be described.

In the sixth embodiment, the heater includes a heat storage device 48, the exhaust-heat recovery device 44, and the electric heater 47. As shown in FIG. 9, the heat storage device 48, the exhaust-heat recovery device 44, and the electric heater 47 are located downstream of the engine 11 and upstream of the heater core 25. For example, the heat storage device 48 may store the cooling water, which is heated in the engine 11, while keeping the cooling water warm. The heat storage device 48 may supply the warm cooling water into the cooling water circuit 23 to heat the cooling water circulating through the cooling water when the engine-outlet water temperature is low. The heat storage device 48 is located downstream of the engine 11. The exhaust-heat recovery device 44 is located downstream of the heat storage device 48. The electric heater 47 is located downstream of the exhaust-heat recovery device 44. The heater core 25 is located downstream of the electric heater 47. That is, in the sixth embodiment, the heat storage device 48 is added to the configuration of the fifth embodiment. In the sixth embodiment, the cooling water is allowed to flow through the engine 11, the heat storage device 48, the exhaust-heat recovery device 44, the electric heater 47, and the heater core 25 in this order, and then returns to the engine 11 from the heater core 25.

Here, a temperature of the cooling water stored in the heat storage device 48 may fall. Therefore, the heat storage device 48 is located closest to the engine 11 such that the cooling water flowing out of the heat storage device 48 can be heated by another device located downstream of the heat storage device 48.

The sixth embodiment can provide the same effects as the first embodiment since the heater is located downstream of the engine 11 and upstream of the heater core 25.

In the sixth embodiment, the output of the electric heater 47 may be adjusted based on the output of the exhaust-heat recovery device 44. Alternatively, the output of the engine 11 and the output of the electric heater 47 may be adjusted based on the SOC of the high-pressure battery 18.

Seventh Embodiment

Figure 10:
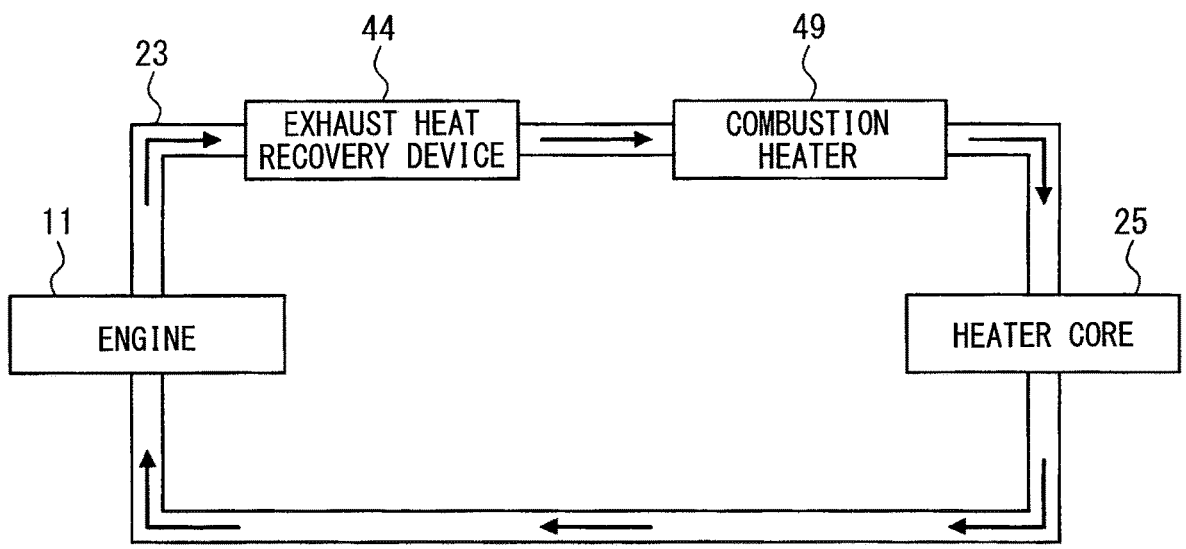
FIG. 10 is a schematic diagram of a cooling water circuit in a heating operation according to a seventh embodiment.

A seventh embodiment will be described hereafter referring to FIG. 10. In the seventh embodiment, parts different from the first embodiment will be described.

In the seventh embodiment, the heater includes the exhaust-heat recovery device 44 and the combustion heater 49. As shown in FIG. 10. the exhaust-heat recovery device 44 and the combustion heater 49 are located downstream of the engine 11 and upstream of the heater core 25. For example, the combustion heater 49 may combust the fuel for the engine 11 and may heat the cooling water using the combustion heat. The exhaust-heat recovery device 44 is located downstream of the engine 11. The combustion heater 49 is located downstream of the exhaust-heat recovery device 44. The heater core 25 is located downstream of the combustion heater 49. In the seventh embodiment, the cooling water is allowed to flow through the engine 11, the exhaust-heat recovery device 44, the combustion heater 49, and the heater core 25, and then returns to the engine 11 from the heater core 25.

The combustion heater 49 can be operated stable without relying on the heater-core-inlet water temperature. Accordingly, the heater-core-inlet water temperature can be controller easily. Therefore, the combustion heater 49 is located immediately upstream of the heater core 25 such that the heater-core-inlet water temperature becomes the target value with minimum output.

The seventh embodiment can provide the same effects as the first embodiment since the heater is located downstream of the engine 11 and upstream of the heater core 25.

In the seventh embodiment, the output of the combustion heater 49 may be adjusted based on the output of the exhaust-heat recovery device 44.

In the fourth to seventh embodiments, the output of the exhaust-heat recovery device 44 may be calculated based on the EHR-inlet water temperature detected by the EHR-inlet temperature sensor 45 and the EHR-outlet water temperature detected by the EHR-outlet temperature sensor 46. Alternatively, the output of the exhaust-heat recovery sensor 44 may be estimated based on the output of the engine 11. In addition, the operation states of the engine 11 may be switched between being on and being off based on the output of the exhaust-heat recovery device 44.

Eighth Embodiment

Figure 11:
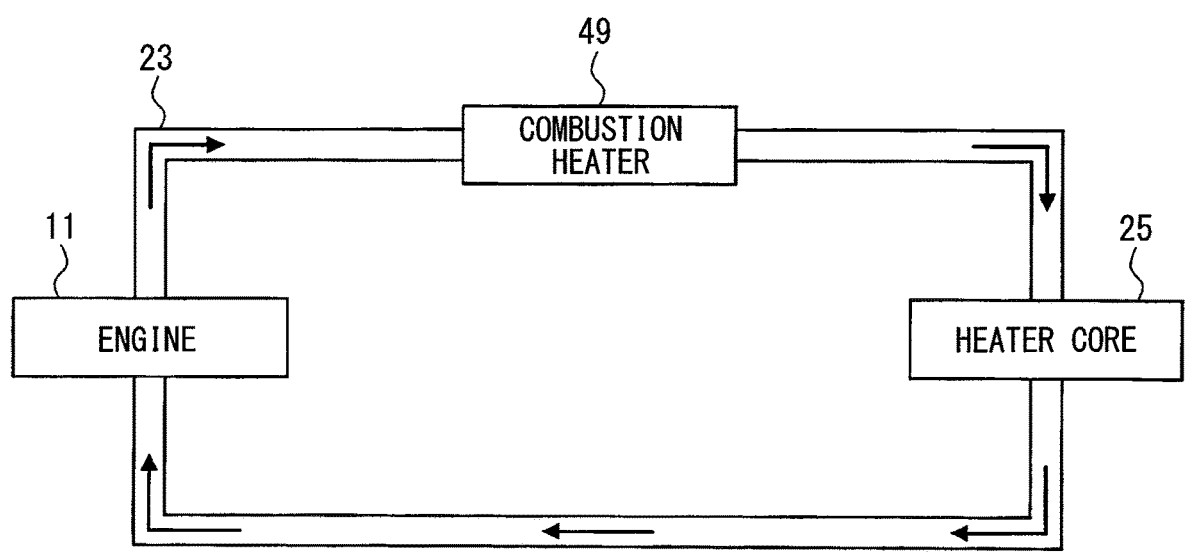
FIG. 11 is a schematic diagram of a cooling water circuit in a heating operation according to an eighth embodiment.

An eighth embodiment will be described hereafter referring to FIG. 11. In the eighth embodiment, parts different from the first embodiment will be described.

In the eighth embodiment, the heater includes the combustion heater 49. As shown in FIG. 11, the combustion heater 49 is located downstream of the engine 11 and upstream of the heater core 25. The combustion heater 49 is located downstream of the engine 11. The heater core 25 is located downstream of the combustion heater 49. In the eighth embodiment, the cooling water is allowed to flow through the engine 11, the combustion heater 49, and the heater core 25, and then returns to the engine 11 from the heater core 25.

The eight embodiment can provide the same effects as the first embodiment since the heater is located downstream of the engine 11 and upstream of the heater core 25.

Other Embodiment

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure. It should be understood that structures described in the above-described embodiments are preferred structures, and the present disclosure is not limited to have the preferred structures. The scope of the present disclosure includes all modifications that are equivalent to descriptions of the present disclosure or that are made within the scope of the present disclosure.

In the fourth to eighth embodiments, the engine-inlet water temperature may be decreased by decreasing the flow rate of the cooling water, which circulates through the cooling water circuit 23, as the engine-outlet water temperature decreases.

The heater, which is located downstream of the engine 11 and upstream of the heater core 25, may include various devices. A quantity of the devices may not be limited. The devices included in the heater and the quantity of the devices may not be limited to the above-described examples and may be changed as required.

In the above-described embodiments, the hybrid ECU 39 operates the heating control routine. However, another ECU other than the hybrid ECU 39 may operate the heating control routine. For example, the another ECU may be at least one of the engine ECU 40, the MG-ECU 41, or the air conditioning ECU 42. Alternatively, the hybrid ECU 39 may operate the heating control routine together with another ECU.

In the above-described embodiments, a part of or an entirety of functions operated by the ECU may be configured, as hardware, by one or more devices such as IC.

The present disclosure is not limited to be mounted to the vehicle having the above-described system shown in FIG. 1. For example, the vehicle may have various configurations including the engine, which is the power source for the vehicle, and the heater core, which is configured to heat air using the heat of the cooling water for the engine.

The invention claimed is:

1. An air conditioner for a vehicle, comprising:
    a cooling water circuit that is configured to allow a cooling water to circulate therethrough via an engine and a heater core in a heating operation, the engine being a power source for the vehicle, the heater core being configured to heat air using a heat of the cooling water;
    a heater that is located downstream of the engine and upstream of the heater core in the cooling water circuit and is configured to heat the cooling water; and
    an output controller,
wherein:
    the heater includes an exhaust-heat recovery device that allows the cooling water to flow therethrough while exchanging heat with an exhaust gas from the engine and that is configured to heat the cooling water by using heat of the exhaust gas and a heat source that includes a heat pump;
    the output controller is configured to adjust an output of the heat source based on an output of the exhaust-heat recovery device;
    the exhaust-heat recovery device is located downstream of the heat pump; and
    the heater core is located downstream of the exhaust-heat recovery device.

2. The air conditioner for a vehicle according to claim 1, the air conditioner further comprising:
    an EHR-inlet temperature sensor that is configured to detect a temperature of the cooling water flowing into the exhaust-heat recovery device; and
    an EHR-outlet temperature sensor that is configured to detect a temperature of the cooling water flowing out of the exhaust-heat recovery device, wherein
    the output controller is configured to calculate the output of the exhaust-heat recovery device using the temperature detected by the EHR-inlet temperature sensor and the temperature detected by the EHR-outlet temperature sensor.

3. The air conditioner for a vehicle according to claim 1, wherein
    the output controller is configured to estimate the output of the exhaust-heat recovery device based on an output of the engine.

4. The air conditioner for a vehicle according to claim 1, the air conditioner further comprising
    a switching controller that is configured to switch the engine between being operated and being stopped based on the output of the exhaust-heat recovery device.

5. The air conditioner for a vehicle according to claim 1, wherein
    the heat source further includes an electric heater,
    the electric heater is located downstream of the exhaust-heat recovery device, and
    the heater core is located downstream of the electric heater.

6. The air conditioner for a vehicle according to claim 5, wherein
    the exhaust-heat recovery device is located downstream of the engine.

7. The air conditioner for a vehicle according to claim 6, wherein
    the heat source further includes a heat storage device,
    the heat storage device is located downstream of the engine, and
    the exhaust-heat recovery device is located downstream of the heat storage device.

8. The air conditioner for a vehicle according to claim 1, wherein
    the heat source includes a combustion heater,
    the exhaust-heat recovery device is located downstream of the engine,
    the combustion heater is located downstream of the exhaust-heat recovery device, and
    the heater core is located downstream of the combustion heater.

9. The air conditioner for a vehicle according to claim 1, wherein
    the heat source includes a combustion heater,
    the combustion heater is located downstream of the engine, and
    the heater core is located downstream of the combustion heater.

10. The air conditioner for a vehicle according to claim 1, wherein
    the heat source includes at least one of a heat pump or an electric heater, and
    the output controller adjusts an output of the engine and an output of the heat source based on a remaining capacity of a battery mounted to the vehicle.

11. The air conditioner for a vehicle according to claim 1, the air conditioner further comprising
    a flow rate controller that is configured to decrease a temperature of the cooling water flowing into the engine by decreasing a flow rate of the cooling water, which circulates through the cooling water circuit, as a temperature of the cooling water flowing out of the engine decreases.

12. An air conditioner for a vehicle, the vehicle including an engine as a power source, the air conditioner is configured to perform an air conditioning for the vehicle, the air conditioner comprising:
    a cooling water circuit that is connectable to the engine and is configured to allow a cooling water to circulate therethrough;
    a heater core that is mounted to the cooling water circuit and is configured to heat an air using a heat of the cooling water;

a heater that is located downstream of the engine and upstream of the heater core in the cooling water circuit and is configured to heat the cooling water; and an output controller, wherein:

the heater includes an exhaust-heat recovery device that allows the cooling water to flow therethrough while exchanging heat with an exhaust gas from the engine and that is configured to heat the cooling water by using heat of the exhaust gas and a heat source that includes an electric heater and a heat storage device;

the output controller is configured to adjust an output of the heat source based on an output of the exhaust-heat recovery device;

the electric heater is located downstream of the exhaust-heat recovering device;

the heater core is located downstream of the electric heater; and the exhaust-heat recovery device is located downstream of the heat storage device.

* * * * *